Figure 1:
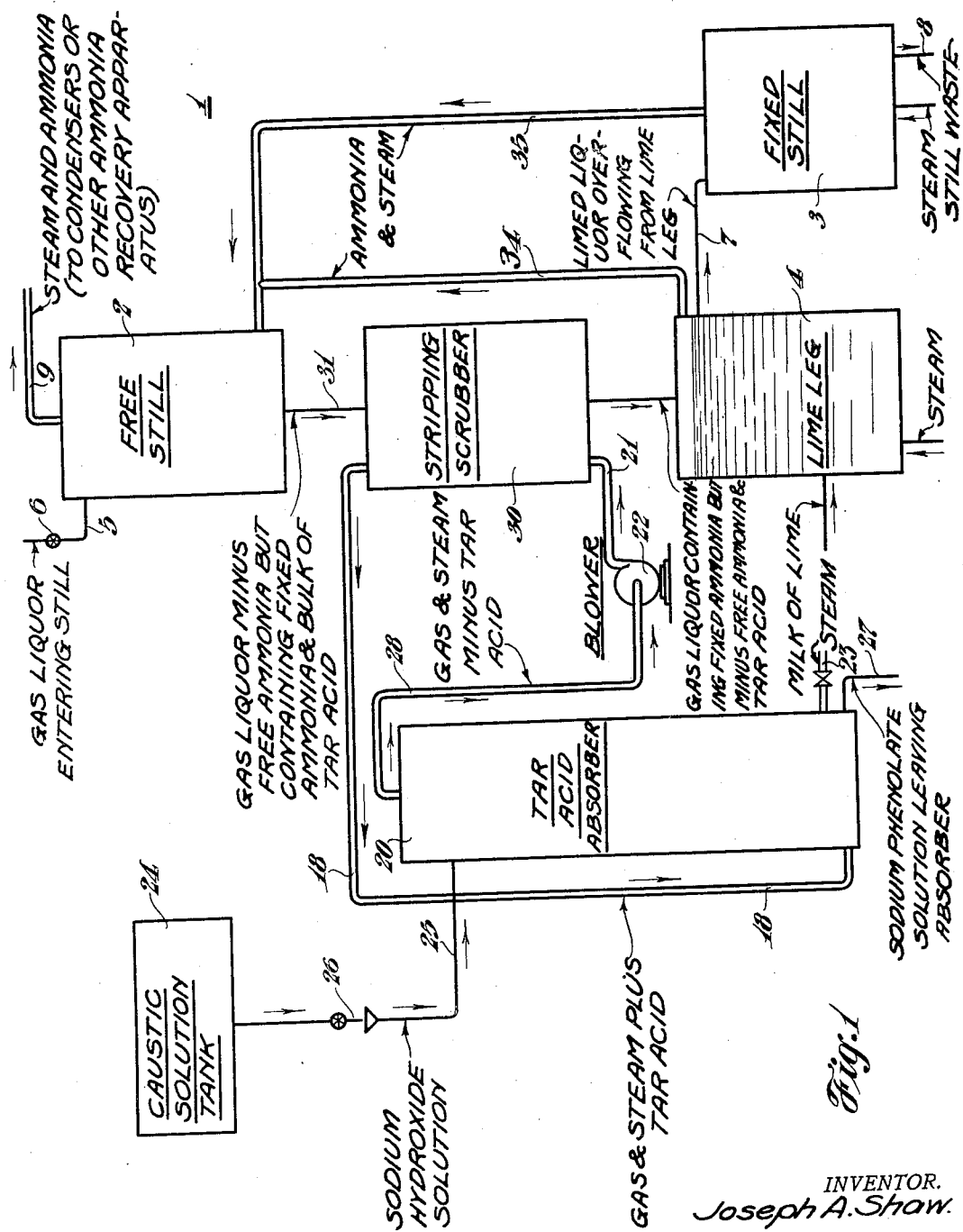

May 1, 1934. J. A. SHAW 1,957,295
PROCESS FOR TREATING LIQUID CONTAINING TAR ACID
Filed Nov. 2, 1927 2 Sheets-Sheet 2

INVENTOR.
Joseph A. Shaw.
BY Jesse P. Langley
ATTORNEY

UNITED STATES PATENT OFFICE 1,957,295

PROCESS FOR TREATING LIQUID CONTAINING TAR ACID

Joseph A. Shaw, Pittsburgh, Pa., assignor to The Koppers Company of Delaware, a corporation of Delaware Application November 2, 1927, Serial No. 230,570

21 Claims. (Cl. 260—154)

This invention relates to the treatment of liquids containing tar acids, such as phenol, cresol and analogous impurities.

My invention relates broadly to the removal of tar acids from any liquid that may contain them, but it has particular application to the treatment of condensates from gas derived from the various systems of coal carbonization and gasification, for example, gas liquor.

An object of the present invention is to provide a process of and apparatus for accomplishing the removal of tar acids from liquid containing them.

A further object of my invention is to provide a process of and apparatus for accomplishing more complete removal of tar acids from liquid than has been possible by means of prior processes and apparatus.

Gas liquor is produced in cooling and condensing coal gas as produced in by-product coke ovens, gas retorts and the like. This liquor contains ammonia in two forms, (1) "free" (i. e. volatile) ammonia and (2) "fixed" ammonia, that must be decomposed prior to volatilization. Gas liquor also contains phenol, cresol, and analogous substances, herein designated as tar acids.

Gas liquor, after separation of such tar as may be entrained therewith, is ordinarily distilled in an ammonia still comprising a free ammonia still or "free section", a fixed ammonia still or "fixed section", and a lime leg. The free ammonia is driven off by steam in the free ammonia still, and the partially distilled liquor enters the lime leg, where it is mixed with milk of lime. The mixture of milk of lime and liquor is then treated with steam in the fixed ammonia still where the fixed ammonia of the liquor is decomposed and the ammonia driven off in vapor form.

The effluent or waste liquor from the fixed ammonia still contains principally various calcium salts formed in the decomposition of fixed ammonia, and is disposed of by draining it into a sewer or stream, or in any other feasible manner.

Tar acids contained in the gas liquor, if not volatilized and removed in the free ammonia still, are carried down with the gas liquor descending the still, and react with milk of lime to form calcium compounds. Such compounds are not volatile, and consequently escape from the still in the effluent or waste liquor.

Modern legislation concerning stream pollution is making it more and more difficult for gas manufacturers or others to dispose of ammonia still effluent containing tar acids by simply draining it into a sewer or stream. In the sterilization of water for drinking purposes by means of chlorine or chlorine compounds, if tar acids are present, chlorphenols and analogous substances are produced that are capable of imparting a disagreeable taste and odor to large amounts of water and which are on this account highly noxious in character.

It is thus desirable to accomplish substantially complete removal of tar acids either from the gas liquor itself or from the effluent or waste liquor, prior to disposal of the latter.

According to my invention, I provide for the substantially complete removal of tar acids from the gas liquor itself preferably after distillation of free ammonia therefrom, or from the effluent liquor leaving the ammonia still after complete distillation of the gas liquor.

I have found that substantially complete elimination of tar acids from gas liquor may be accomplished by heating the liquor to just below its boiling point and holding it at this temperature while blowing a gas, such as air or other inert gas through it. Under these conditions, the gas effects a volatilization of tar acids and is then treated for removal of tar acids therefrom, preferably with an alkali, for example a solution of sodium hydroxide. The gas is then recirculated for further use.

With respect to gas liquor, the process of my invention may be performed in several ways that are broadly divisible according to whether the gas liquor is treated before or after distillation of its fixed ammonia content. In either case it is desirable to insure that substantially all of the tar acids present in the liquor are brought to the point of removal in order to prevent their escape into other parts of the system, entrapment in the waste liquor, and the like.

The gas liquor may be treated for removal of tar acids prior to introduction into the ammonia still if so desired, but ordinarily it is preferable to accomplish the removal of tar acids in conjunction with, or immediately after, the distillation of free ammonia, but prior to liming the gas liquor for recovery of its fixed ammonia content, as will hereinafter be described.

Moreover, my process may be variously performed in this respect according to whether it is to be carried out in conjunction with existing apparatus that should be modified as little as possible or with new apparatus that may be specially designed for this purpose, and with respect to various other considerations.

However, it is preferred to perform my process in conjunction with apparatus designed specifically therefor and in which the objects and advantages of my invention may best be realized.

In order that these and other aspects of my invention may be clearly set forth and understood, I now describe, with reference to the accompanying drawings, various ways in which my invention may be embodied and performed.

Figure 2:
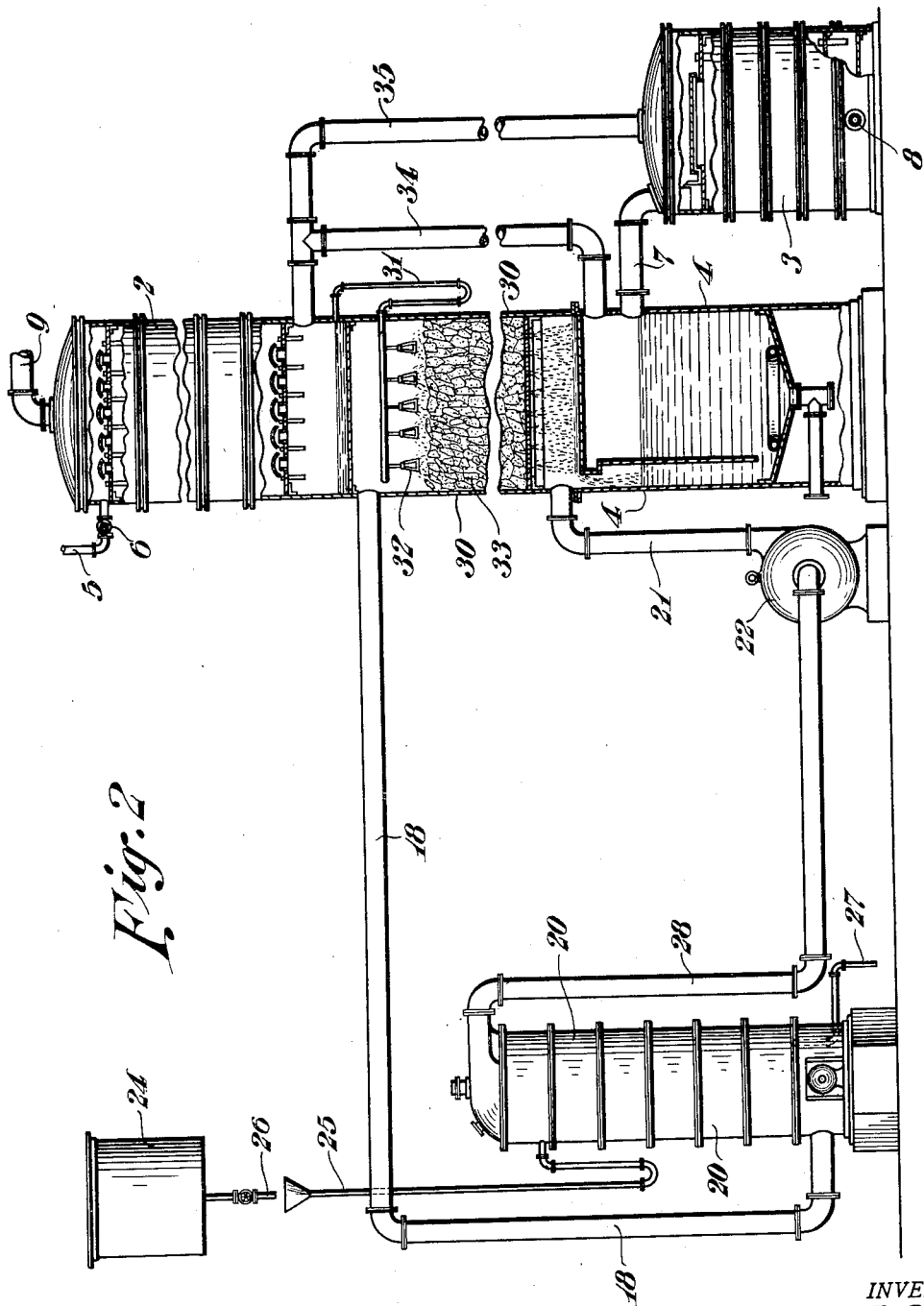

In these drawings,

Figure 1 is a diagrammatic view of a preferred form of process of distilling gas liquor and removing and recovering tar acid therefrom; and Figure 2 is an elevational view, partially in section, of apparatus for distilling gas liquor and for removing and recovering tar acids therefrom, parts being broken away.

Similar characters of reference designate similar parts in each of the two views of the drawings.

Referring to the drawings, the distillation of gas liquor or other ammoniacal liquor containing tar acids is ordinarily conducted in an ammonia still unit 1 of the usual type. This unit is ordinarily comprised of a free ammonia still 2 and a fixed ammonia still 3. The stills 2 and 3 are constituted of a plurality of superimposed bell-and-tray sections, the bell-and-tray sections of the free ammonia still 2 being supported upon a large section or "lime-leg" 4 that is adapted to contain milk of lime.

The liquor is admitted to the still 2 through an inlet conduit 5, the rate of flow being regulated by a valve 6. The gas liquor passes downward through the free ammonia still 2, and in the apparatus of the prior art then traverses the lime leg 4 and passes through a conduit 7 into the fixed ammonia still 3. The limed liquor now passes down through the fixed ammonia still 3 and the effluent escapes through a drain 8.

Steam and milk of lime are admitted as necessary. During the progress of the gas liquor through the free ammonia still 2, the free ammonia is distilled off, escaping from the still 2 through a distillate pipe 9. The gas liquor, less its free ammonia content, then enters the lime leg 4 and is mixed with milk of lime, whereby the fixed ammonia is decomposed into free ammonia that is then distilled off in the still 3. The volatilized ammonia then passes through a pipe 35, through the still 2 and escapes through the pipe 9.

In the present instance, the distillation of the gas liquor is conducted in such manner as to eliminate substantially all of the tar acids therefrom prior to contact of the liquor with milk of lime. It is important to substantially completely remove tar acids from the gas liquor prior to contact with milk of lime in the lime leg 4, for the reason that these impurities, upon contact with lime, are rendered non-volatile and will accordingly be carried out in this form in the effluent liquor removed through drain 8, which as explained hereinabove, is to be avoided unless special provision is made to remove tar acids therefrom, as will be shown hereinbelow.

The ammonia gas, $H_2S$, HCN, $CO_2$, and steam pass through the pipe 9 into a dephlegmator and a condenser (not shown), or into the gas main at a point just prior to the entry of the gas into the ammonia saturator.

In the system of the present invention, a stripping section 30 is interposed between the free ammonia still 2 and the lime leg 4. The stripping section 30 may, as in the present instance, constitute an integral part of the structure of the still 1, or, as originally shown and described herein and as shown and described in my copending application, Serial No. 308,966, filed September 28, 1928, which is a division of the present application, it may constitute a separate tower.

The gas liquor is introduced to the free ammonia still 2 through the pipe 5, as in the prior art. In passing downward through the free ammonia still 2, it is distilled for substantially complete removal of its free ammonia content. The temperatures in the free ammonia still 2 are maintained at such a point as to insure that substantially no tar acids will escape from the free ammonia still 2 through the vapor pipe 9. The contact material 33 may be any suitable material, such as coke, tile or the like, that is adapted to effect intimate contact between streams of liquid and gas flowing therethrough. The stripping section 30 is preferably insulated to prevent undue cooling of the liquid and gas within the same.

During the passage of the hot liquid downward through the contact material 33, it is exposed to a rising current of an inert gas, such as air or other gases which are not chemically reactive with the tar acids under the conditions prevailing in the process. By reason of the high temperature of the liquid and the scrubbing action of the gas, the tar acids present in the liquid are volatilized and carried off by the gas escaping with the gas from the stripper 30 through a pipe 18.

In order to prevent unnecessary loss of ammonia and to prevent undue losses due to latent heat of vaporization, it is desirable to employ the gas used for removing tar acids from the liquid in a closed cycle comprising recirculation through the stripping section 30 and a washer 20, wherein the gas is treated for removal of tar acids extracted from the liquid in the stripping section 30.

The current of inert gas is introduced through the pipe 21 to the bottom of the stripping section 30. The gas passes upward through the contact material 33, removing tar acids from the liquor passing downward through the same, and passes out of the stripping section 30 through the pipe 18 to the washer 20.

In the present instance a Feld washer is employed for treating the gas. This washer 20 is of the usual construction and is provided with suitable heating means, for example, a steam connection 23. The washer 20 is supplied with a solution of caustic soda (NaOH) from a suitable reservoir 24 through a sealed pipe 25, wherein is situated a sight-feed 26 to facilitate regulation of flow. The gas and caustic solution pass through the washer 20 in counter-current and tar acids present in the gas are absorbed by the caustic solution as sodium compounds that are not volatile under these conditions and which are of valuable character. Preferably a concentrated solution of alkali is employed and the rate of flow of the solution is so regulated that the solution leaving the washer 20 through a drain pipe 27 is substantially saturated with respect to tar acids under these conditions.

The rate of flow of the solution is further regulated according to the tar acid content of the gas emerging from the washer 20, which should be substantially nil.

The phenol-free gas passes out of the washer 20 through a pipe 28 and is drawn into the blower 22, whence it is forced through pipe 21 into the stripping section 30 for treatment of further quantities of liquid.

The gas throughout the cycle is preferably kept at a temperature sufficiently high to prevent undesirable condensation of water therefrom or in other words at a temperature not substantially lower than the temperature of the liquor being treated and preferably at a temperature at least as high as the temperature of the liquor. The liquor, as stated hereinabove, is maintained at a temperature just below its boiling point which may be, for example, from 97° C. to 102° C. The recirculating gas is thus saturated with water vapor throughout its cycle and comprises a mixture of gas and steam.

It will be obvious that condensation of moisture from the gas in the absorber 20 will not occur if the alkaline absorbent liquid employed therein is maintained at a temperature approximating its boiling point. In practice, and particularly where relatively strong solutions of alkali are employed in the absorber 20, this temperature may be and in fact usually is higher than the temperature of the liquor being treated for the removal of tar acid, for example, from 100° to 110° C.

These temperature conditions are of great importance by reason of their effect on dephenolization efficiency, steam consumption, and other factors determining the ultimate economy of the process. However, it will be apparent that ammonia liquor or the like can be dephenolized according to the present invention with a considerable degree of success even though slight deviations from the preferred temperature conditions are permitted.

Moreover, it will be apparent that the boiling points of the liquids will vary with barometric changes and will be increased if the cycle of gas recirculation is maintained at a pressure higher than atmospheric and consequently the boiling points referred to herein are not intended to mean the boiling points of the liquids under standard conditions only, but are intended to designate the actual boiling points of the liquid under operating conditions. In this connection it may be noted that operation under pressure higher than atmospheric is specifically set forth and claimed in the copending application of David L. Jacobson, Serial No. 512,590, filed Jan. 31, 1931.

In the present instance the liquor after removal of tar acids must still be treated for removal of its fixed ammonia content. For this purpose it passes into the lime leg 4 where it is treated with milk of lime, the resultant mixture overflowing through the pipe 7 into the fixed ammonia still 3. The ammoniacal vapors liberated in the lime leg 4 and the fixed ammonia still 3 escape through pipes 34 and 35, respectively, into the lower portion of the free ammonia still 2, pass upward through the latter and escape through the vapor pipe 9, together with the steam and ammonia liberated in the free ammonia still 2 itself. The effluent from the fixed ammonia still 3 escapes through the drain pipe 8.

It will be seen that in this instance, no tar acids are carried into the main gas stream or the condenser nor does the effluent liquor from the fixed ammonia still 3 contain any substantial amount of tar acids. Thus the object of the present invention is accomplished. I have in fact found that substantially complete removal of tar acids from gas liquor may be obtained in this manner.

It may in some instances be desirable to accomplish the removal of tar acids in another manner. The distillation of the gas liquor for removal of free and fixed ammonia is accomplished as in the usual practice, except that it is purposely provided by means of proper operating conditions that substantially the entire tar acid content of the original gas liquor passes downward through the free ammonia still in the liquor and is fixed in the form of calcium compounds in the lime leg. In this instance, the effluent liquor leaving the fixed still will contain substantially all of the original tar acid content of the gas liquor but in non-volatile form.

Accordingly, I render these tar acids volatile by acidifying the waste liquor. This may conveniently be done by means of flue gas or other acid and I then treat the acidified waste liquor in which the tar acids are now present as such with a current of inert gas in the manner hereinabove described.

While I have hereinabove described my invention with respect to the treatment of gas liquor and other ammoniacal liquor, it is not limited to the treatment of such materials, but may advantageously be employed for the removal of tar acids from any other liquids that may contain them. For example, liquids produced in tar plants, phenol and cresol plants, and even tar itself, may thus be treated, with due regard to the nature of the liquid under consideration, the proper operating conditions, and the like.

While I have described my invention hereinabove with respect to certain specific examples, it is not limited to such specific illustrative methods or apparatus but may be variously performed within the scope of the following claims.

I claim as my invention:

1. The process of treating an aqueous liquid containing tar acid which comprises recirculating an inert gas through said liquid and through tar acid absorptive means, the temperature of the gas throughout its cycle of recirculation being maintained at a point just below the boiling point of said liquid.

2. The process of treating an aqueous liquid containing tar acid which comprises recirculating air and steam through said liquid and through tar acid absorptive means, the temperature throughout being maintained at a point just below the boiling point of said liquid.

3. The process of removing tar acid from an aqueous liquid containing it which comprises recirculating an inert gas saturated with water vapor through said liquid and through means for extracting said tar acid from said gas, the temperature of said gas throughout its cycle of recirculation being maintained at such a point that substantially no condensation of water vapor occurs.

4. The process of removing tar acid from an aqueous liquid containing it which comprises passing a substantially ammonia-free inert gas through the liquid at a temperature just below the boiling point of the latter, removing the gas, passing it through an agent effective to remove tar acid therefrom, and recirculating said gas without substantially reducing the temperature thereof for treatment of further quantities of said liquid.

5. The process of treating an aqueous liquid containing tar acid which comprises heating the liquid to just below its boiling point and passing an inert gas through it at this temperature whereby said tar acid is volatilized and removed, removing the gas and treating it for removal of said tar acid and recirculating the gas without substantially lowering its temperature for further treatment of said liquid.

6. The process of removing tar acid from a liquid containing it which comprises continuously recirculating a body of substantially ammonia free inert gas through the liquid to be treated at a temperature sufficiently high to promote volatilization of tar acid and through an alkaline solution maintained at a temperature as high as the temperature of the liquid being treated.

7. The process of removing tar acid from a liquid containing it which comprises maintaining the liquid to be treated at a temperature just below its boiling point, continuously recirculating a body of inert gas through said liquid and through a solution of an alkali capable of reacting with tar acid to form compounds having substantially no vapor pressure with respect to tar acid, the temperature throughout the cycle of recirculation of said gas being maintained at a temperature as high as the temperature of the liquid being treated.

8. The process of removing tar acid from a liquid containing it which comprises continuously bringing a flow of said liquid into contact with a body of inert gas at a temperature at which volatilization of tar acid is effected by said gas, removing said gas and treating it to remove tar acid therefrom at a temperature as high as the temperature of said liquid, and then bringing said gas into further contact with the flow of said liquid for removal of tar acid without subjecting it to any substantial temperature reduction.

9. The process of treating a liquid containing tar acid and fixed ammonia, which comprises subjecting the liquid to contact with an inert gas at a temperature sufficient to promote the volatilization of said tar acid therefrom, said gas being recirculated through a cycle comprising said contact stage and an absorption stage maintained at a temperature not lower than that of said liquid, wherein said tar acid is in turn removed from said gas, and the fixed ammonia left in said liquid for subsequent removal therefrom of ammonia originally present in fixed form.

10. The process of removing tar acid from a liquid containing it which comprises repeatedly passing an inert gas through said liquid at a temperature not substantially below its boiling point for the removal of tar acid therefrom and through absorbent material effective to remove tar acid from said gas, the gas throughout its repeated contacts with said liquid and said absorption material being maintained at a temperature not lower than that of said liquid.

11. The process of treating gas liquor which comprises distilling the liquor with steam to remove ammonia present in free form but under such temperature conditions that the bulk of the tar acid is retained by the liquor and simultaneously heating it for the following tar acid removal step, then treating the liquor thereby deprived of substantially all of its free ammonia content by convective distillation to remove tar acid therefrom while leaving the fixed ammonia therein for subsequent treatment of the liquor with a compound effective to convert ammonia originally present in said liquor in fixed form to free ammonia and final distilling of the treated liquor with steam for the removal of said ammonia converted from fixed to free form.

12. The process of treating gas liquor containing tar acid and fixed ammonia which comprises treating the liquor while deprived of substantially all free ammonia for the removal of said tar acid by convective distillation with an inert gas having a vapor pressure with respect to ammonia not higher than that of the liquid, while leaving the fixed ammonia therein for subsequent treatment of the liquor with a compound effective to convert ammonia originally present in said liquor in fixed form to free ammonia and final distilling of the treated liquor with steam for the removal of said ammonia converted from fixed to free form.

13. The process of treating gas liquor containing tar acid and fixed ammonia which comprises treating the liquor while deprived of substantially all free ammonia for the removal of said tar acid by convective distillation with an inert gas recirculated through a cycle including said convective distillation stage and a stage wherein tar acid is removed from said gas while leaving the fixed ammonia therein for subsequent treatment of the liquor with a compound effective to convert ammonia originally present in said liquor in fixed form to free ammonia and final distilling of the treated liquor with steam for the removal of said ammonia converted from fixed to free form.

14. The process of treating a free-ammonia free gas liquor which comprises removing tar acid from said liquor by passing a stream of inert gas through said liquor at a temperature not substantially below the boiling point of said liquor.

15. The process of treating gas liquor which comprises removing tar acid from said liquor by passing an inert gas therethrough in a stripping stage at a temperature not substantially below the boiling point of said liquid, said gas being subsequently passed through a material having absorbent properties with respect to tar acid, and again employed for further removal of tar acid.

16. The process of removing tar acid from ammonia liquor containing it which comprises bringing said liquor into contact with an inert gas having a vapor pressure with respect to ammonia substantially equal to the vapor pressure of the liquor with respect to ammonia, but unsaturated with respect to tar acid, whereby said gas removes tar acid from said liquor without substantially affecting the concentration of said liquor with respect to ammonia.

17. The process of removing tar acid from ammonia liquor containing it which comprises bringing said liquor into contact with an inert gas having a vapor pressure with respect to ammonia substantially equal to the vapor pressure of the liquor with respect to ammonia, but unsaturated with respect to tar acid, whereby said gas removes tar acid from said liquor without substantially affecting the concentration of said liquor with respect to ammonia and then treating said gas with an agent effective to remove tar acid therefrom but ineffective to remove ammonia from said gas.

18. The process of removing tar acid from ammonia liquor containing it which comprises bringing said liquor into contact with an inert gas having a vapor pressure with respect to ammonia substantially equal to the vapor pressure of the liquor with respect to ammonia, but unsaturated with respect to tar acid, whereby said gas removes tar acid from said liquor without substantially affecting the concentration of said liquor with respect to ammonia and then treating said gas with an agent effective to remove tar acid therefrom but ineffective to remove ammonia from said gas and returning said gas to contact with said liquor for the removal of a further quantity of tar acid therefrom.

19. The process of removing tar acid from a liquid containing it which comprises establishing a flow of said liquid at a temperature not substantially below its boiling point and a flow of alkaline tar acid absorbent liquid at a temperature at least as high as that of the liquid to be treated, and passing a stream of inert gas alternately through said liquids, said gas being maintained at a temperature at least as high as the temperature of the liquid to be treated, whereby tar acid is removed from the liquid containing it and transferred to said alkaline absorbent liquid.

20. The process of removing tar acid from a liquid containing it which comprises continuously bringing the flowing liquid into contact with a body of inert gas at a temperature sufficient to promote the volatilization of said tar acid and continuously recirculating said body of gas through a cycle comprising said contact stage and a stage wherein it is treated for removal of tar acid therefrom, said gas being maintained throughout its cycle at such a temperature that no condensation from said gas of components thereof originally present in said liquor other than tar acid occurs.

21. In a process of distilling gas liquor containing phenol with the recovery of by-products therefrom which process comprises distillation of free ammonia therefrom and thereafter treating the residual liquor for the recovery of fixed ammonia, the step of bringing the hot gas liquor after the distillation therefrom of free ammonia and before treating it as aforesaid for the recovery of fixed ammonia into intimate contact with substantially inert gas and thereby removing the phenol therefrom.

JOSEPH A. SHAW.